(12) United States Patent
Majeed et al.

(10) Patent No.: US 11,982,986 B2
(45) Date of Patent: May 14, 2024

(54) DATA SYNCHRONIZATION SYSTEM FOR DEVICE BASED ENGINEERING

(71) Applicant: Siemens Aktiengesellschaft, Munich (DE)

(72) Inventors: Rizwan Majeed, Monmouth Junction, NJ (US); Georg Muenzel, Waischenfeld (DE); Gustavo Arturo Quiros Araya, Princeton, NJ (US); Kai Liu, Heroldsberg (DE); Swen Elpelt, Belle Mead, NJ (US); Yunhua Fu, Princeton, NJ (US)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 322 days.

(21) Appl. No.: 17/419,331

(22) PCT Filed: Jan. 25, 2019

(86) PCT No.: PCT/US2019/015062
§ 371 (c)(1),
(2) Date: Jun. 29, 2021

(87) PCT Pub. No.: WO2020/153966
PCT Pub. Date: Jul. 30, 2020

(65) Prior Publication Data
US 2022/0083018 A1 Mar. 17, 2022

(51) Int. Cl.
*G06F 17/00* (2019.01)
*G05B 19/05* (2006.01)
(Continued)

(52) U.S. Cl.
CPC ....... *G05B 19/056* (2013.01); *G05B 19/4185* (2013.01); *G06F 8/658* (2018.02); *G06F 8/71* (2013.01)

(58) Field of Classification Search
CPC ... G05B 19/056; G05B 19/4185; G06F 8/658; G06F 8/71; G06F 8/20; G06F 9/445; G06F 9/52; Y02P 90/02
See application file for complete search history.

(56) References Cited

U.S. PATENT DOCUMENTS 7,096,465 B1  8/2006 Dardinski et al.
7,353,221 B1 * 4/2008 Becker ............... G05B 19/0426
                                                                  711/2

(Continued)

FOREIGN PATENT DOCUMENTS

WO  2013068023 A1  5/2013
WO  2016195690 A1  12/2016
WO  2018169778 A1  9/2018

OTHER PUBLICATIONS

Cristian Gadea et al., A reference architecture for real-time microservice API consumption. In Proceedings of the 3rd Workshop on CrossCloud Infrastructures Platforms, Association for Computing Machinery, Article 2, 1-6, <https://doi.org/10.1145/2904111.2904115>, April (Year: 2016).*

(Continued)

*Primary Examiner* — Greta L Robinson

(57) ABSTRACT

Over the past several decades, rapid advances in semiconductors, automation, and control systems have resulted in the adoption of programmable logic controllers (PLCs) in an immense variety of environments. A synchronization system coordinates storage, retrieval, and activation of engineering object models among local and remote nodes. The synchronization system facilitates local and remote design and development access to the PLCs, as well as continued correct operation of the PLCs.

19 Claims, 9 Drawing Sheets

(51) Int. Cl.
    *G05B 19/418*     (2006.01)
    *G06F 8/658*     (2018.01)
    *G06F 8/71*     (2018.01)

(56) References Cited

U.S. PATENT DOCUMENTS

| | | |
|---|---|---|
| 8,046,444 B2 | 10/2011 | Klug et al. |
| 9,910,419 B2 | 3/2018 | Basulto et al. |
| 2002/0029218 A1* | 3/2002 | Bentley .............. G06F 16/1734 |
| 2012/0143570 A1* | 6/2012 | Austin .................. G06Q 10/00 |
| | | 703/1 |
| 2013/0191106 A1 | 7/2013 | Abruzere et al. |
| 2015/0186119 A1 | 7/2015 | Chouinard et al. |
| 2016/0091882 A1 | 3/2016 | Ludwig et al. |
| 2018/0136910 A1 | 5/2018 | Noetzelmann et al. |

OTHER PUBLICATIONS

PCT International Search Report for corresponding PCT/US2018/021722, filed on Mar. 9, 2018.
PCT Written Opinion of the International Preliminary Examination Report dated Mar. 9, 2018, for corresponding PCT/US2018/021722.
Ramon Barth, et al. "Multi-core Automation" Control Level—with English translation. Nov. 21, 2007. pp. 1-12.
Siemens, "S7-1500 Software Controller CPU 1505S, CPU 1507S" Operating Manual A5E32565315-AA. (Nov. 2014). pp. 1-124.
PCT International Search Report dated Aug. 14, 2019; Application No. PCT/US2019/015062; 14 pages.

* cited by examiner

DATA SYNCHRONIZATION SYSTEM FOR DEVICE BASED ENGINEERING

This application is a national phase filing under 35 U.S.C. § 371 of International Patent Application No. PCT/US2019/015062, filed Jan. 25, 2019, which is incorporated herein by reference in its entirety.

TECHNICAL FIELD

This disclosure relates to programmable logic controllers in industrial environments. In particular, this disclosure relates to synchronization of engineering data for the programmable logic controllers across multiple nodes.

BACKGROUND

Over the past several decades, rapid advances in semiconductors, automation, and control systems have resulted in the adoption of programmable logic controllers (PLCs) and other devices in an immense variety of industrial automation environments. Individual and interconnected PLCs are deployed in a very wide range of industrial control systems and carry out an immense variety tasks. Improvements in synchronizing the engineering data that contains PLC programs, configurations, and other data will enhance remote and local design and development access to the PLCs, as well as the ability of automation environments to continue running correctly.

DETAILED DESCRIPTION

Over the past several decades, rapid advances in semiconductor fabrication, automation, and control systems have resulted in the widespread adoption of programmable logic controllers (PLCs) and other automation control devices in an immense variety of industrial automation environments. In many cases, the automation control devices are designed for high reliability in challenging industrial environments and have very long lifetimes. Improvements in automation environments have recently included having the automation control devices themselves store engineering system functionality and engineering data, e.g., as described in the WIPO application WO 2018/169778, titled Method and System for Device-Based Engineering for Programmable Logic Controllers (PLCs).

Important technical problems pose a challenge to automation control devices in the industrial environment. As examples, the technical problems include storage and retrieval of the engineering data in a consistent and readily available manner that is synchronized across the local and remote nodes that will access the engineering data. A further technical challenge is to provide both local and remote access to the automation control devices and the engineering data in a manner that reliably provides local and remote design, development, and verification access to the automation control devices, while providing a consistent synchronized view of the engineering data regardless of location. The systems and techniques described below solve these and other technical problems.

The systems and techniques handle storing and retrieving engineering data in a synchronized manner, as well as activation of engineering data to the automation control devices. In one implementation, the systems and techniques employ a distributed architecture including a synchronization server, an engineering function server, and a communication server. The synchronization server manages engineering object models (EOMs) that store engineering data across multiple automation control device nodes, edge nodes, and cloud nodes. The synchronization server ensures that an EOM change at any node is reflected to the other nodes. The engineering function server implements and executes device engineering functions on the engineering data in the EOM, e.g., to load, edit, and compile engineering data, and to activate, test, and debug automation control devices. The communication server exposes the device engineering functions in the engineering function server over a network to local and remote nodes, e.g., over a Hypertext Transfer Protocol (HTTP) or HTTP Secure (HTTPS) channel.

Figure 1:
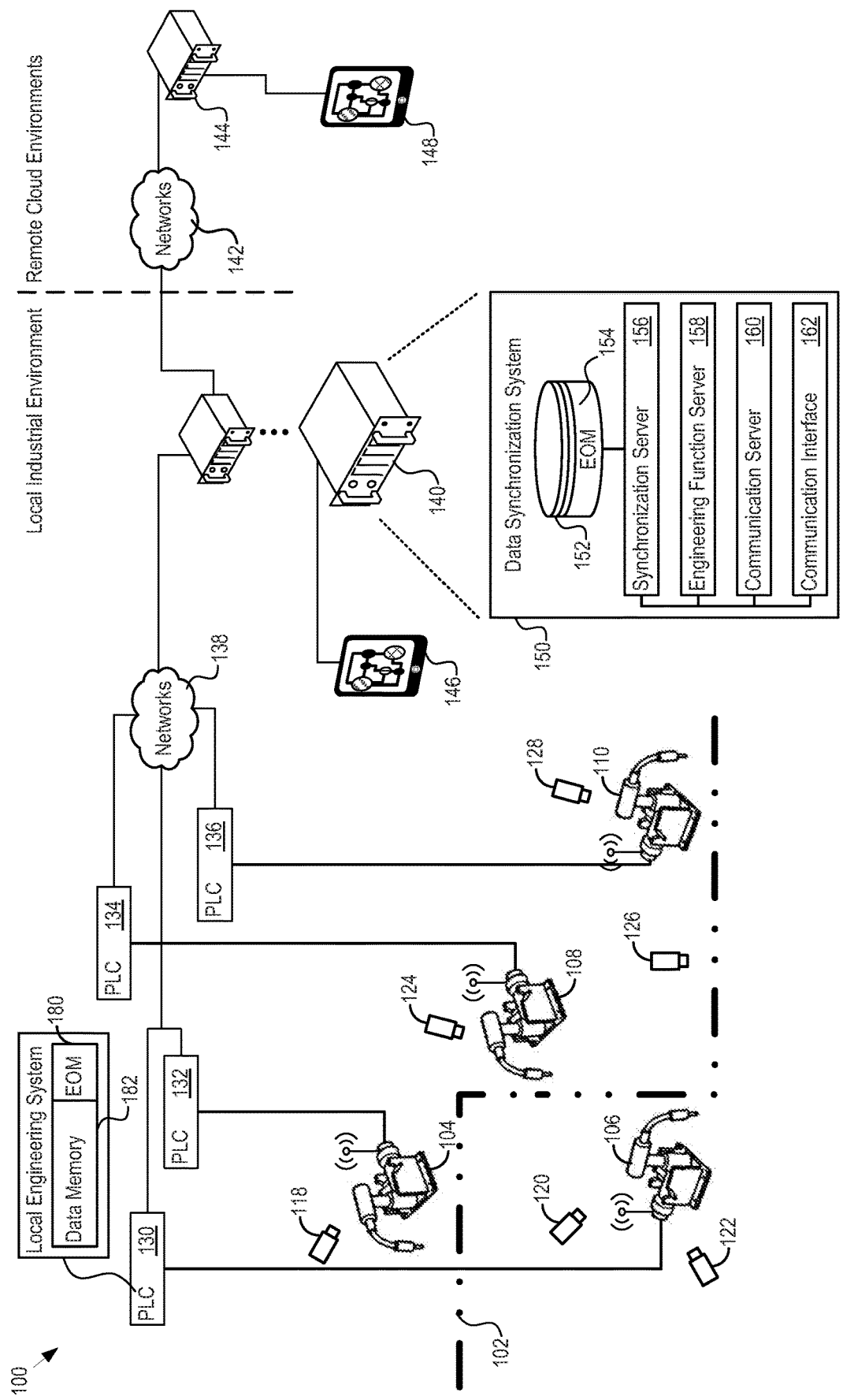
FIG. 1 shows an example industrial automation environment with a data synchronization server.

FIG. 1 shows an example industrial automation environment 100. In this example, the automation environment 100 includes an assembly line 102 and multiple manufacturing devices positioned along the assembly line, e.g., the devices 104, 106, 108, and 110. The automation environment 100 also includes sensors, e.g., the sensors 118, 120, 122, 124, 126, and 128 that provide feedback from the environment 100. The manufacturing devices 104-110 may be any type of controlled machine or system, including as just a few examples: robots, mixers, welders, belts, conveyors, lifts, injectors, lathes, milling machines, fixtures, planers, and the like. The sensors 118-128 may be any type of feedback device, including as just a few examples: cameras, microphones, current sensors, voltage sensors, rotation sensors, vibration sensors, rpm sensors, pressure sensors, touch sensors, proximity sensors, thermocouples, volume sensors, tilt sensors, temperature sensors, and the like. In FIG. 1, the PLCs 130, 132, 134, and 136 control and monitor the devices 104-110.

The PLCs 130-136 are an example of one type of automation control device. Any given automation environment may have any number and type of automation control devices that monitor and control the manufacturing devices and sensors in the automation environment 100. As described in WIPO application WO 2018/169778, any of the automation control devices may store engineering system functionality and engineering data, including a local-node engineering object model (EOM) 180 stored in a local-node data memory 182.

FIG. 1 also shows that the PLCs 130-136 communicate over networks 138 with one or more edge nodes 140. In that sense, the PLCs 130-136 are automation control device nodes that communicate over a network with the edge nodes 140. In turn, the edge nodes 140 communicate over networks 142 with one or more cloud nodes 144, which are typically located remotely from the local automation environment 100. Engineering clients 146 communicate with the edge nodes 140 to access device engineering functions exposed by the edge nodes 140. Similarly, the engineering clients 148 communicate with the cloud nodes 144 to access device engineering functions exposed by the cloud nodes 144.

Any of the edge nodes 140 and cloud nodes 144 may implement an engineering data synchronization system for an industrial automation environment. FIG. 1 shows one example engineering data synchronization system 150. In this example, the data synchronization system 150 includes an edge-node data memory 152 storing an engineering object model (EOM) 154. The EOM 154 may store engineering data for any automation control device in the industrial automation environment 100. The engineering data synchronization system 150 also includes a synchronization server 156 in communication with the data memory 152. The synchronization server 156 is configured to synchronize the engineering data in the EOM 154 responsive to changes in the engineering data that happen locally, e.g., in the edge nodes, device nodes, or remotely, e.g., in the cloud nodes. The synchronization server 156 ensures that an engineering data change in one node is reflected to all the nodes.

The engineering data synchronization system 150 also includes an engineering function server 158 in communication with the synchronization server 156. The engineering function server 158 is configured to implement device engineering functions applicable to the automation control devices on the engineering data stored in the EOM 154. Examples of such device engineering functions include loading, editing, compiling, activating, and debugging data and instructions for the automation control devices. Further, a communication server 160 (e.g., a web server) communicates with the engineering function server 158. The communication server 160 implements an engineering function interface configured to expose the device engineering functions over a network to any authorized client, e.g., via a web services interface. The engineering client 146 is an example of an authorized client and may request execution of the device engineering functions. Any of a wide variety of proprietary or industry standard communication interfaces 162 may be implemented to support communication between the data synchronization system 150, the authorized clients 146, the cloud nodes 144, the edge nodes 140, and the automation control devices over the networks 138 and 142.

The synchronization server 156 hides the automation control device connectivity from the authorized clients 146 and provides a consistent interface for EOM engineering data requests and services. In the layered architecture approach shown in FIG. 1, the data synchronization system 150 is connected to the automation control devices and is responsible for replicating any changes in the EOM across the automation control devices and cloud nodes. To that end, the synchronization server may implement and enforce version control techniques for database systems. Any engineering data changes coming from the cloud nodes flow through the synchronization server 156, which provides a single point of EOM management to enforce engineering data consistency across the connected nodes. The synchronization server 156 decides when to send or extract data from the automation control device based on the EOM request it has received, as explained below for several example use cases with regard to the logic shown in FIGS. 2-8.

Figure 2:
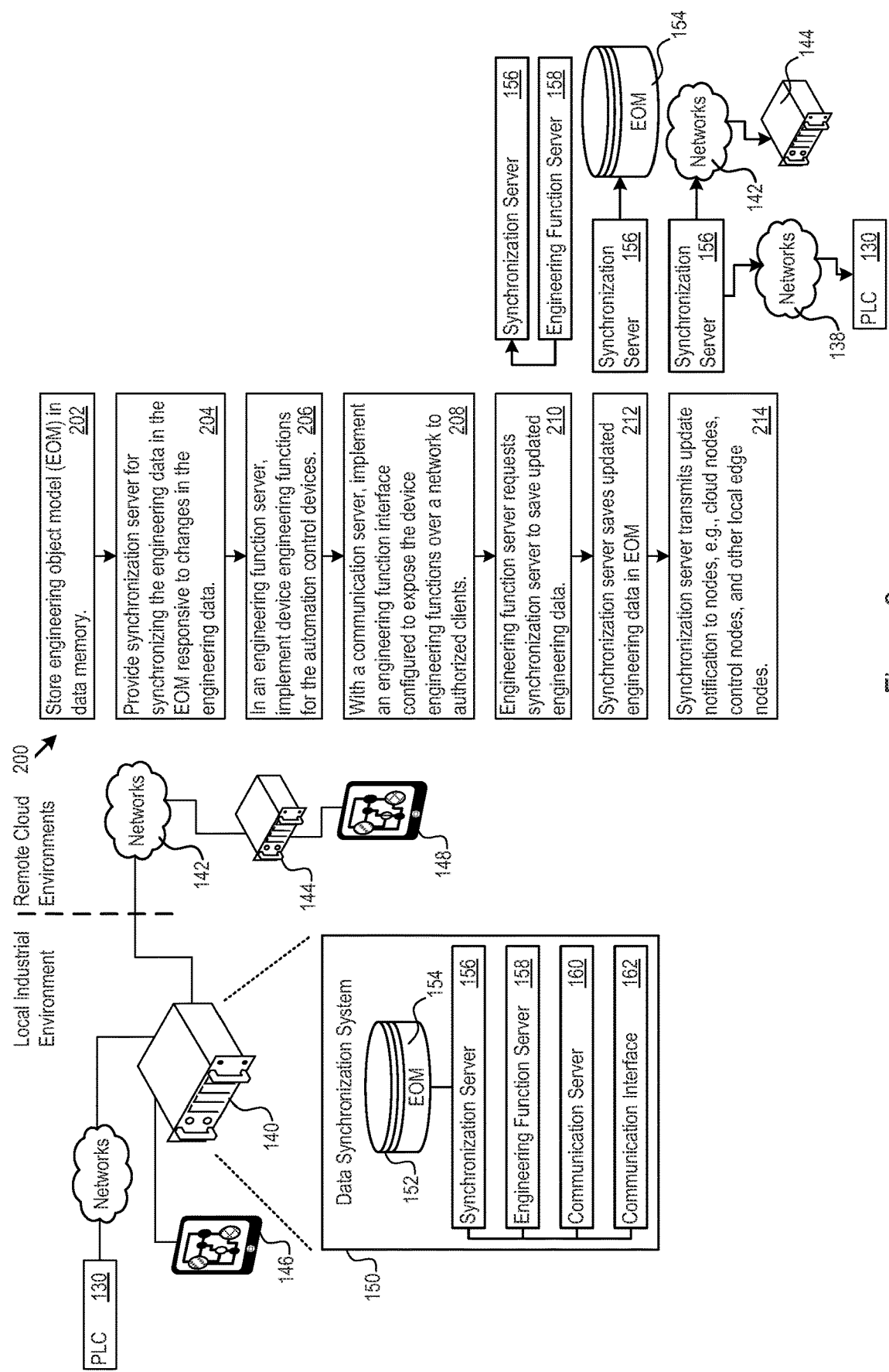
FIG. 2 shows an example of logic for saving engineering data in a synchronized manner.

In FIG. 2, in terms of implementing the data synchronization system 150 itself, an EOM 154 is created and maintained with engineering data (202). The synchronization server 156 is provided for synchronizing the engineering data in the EOM 154 responsive to changes in the engineering data (204). The engineering function server 158 implements device engineering functions (206), while the communication server 160 implements an engineering function interface that is configured to expose the device engineering functions over a network to authorized clients 146 (208).

FIG. 2 shows an example of logic 200 for saving engineering data, with synchronization, in the EOM 154. In this scenario, the engineering data has changed locally, e.g., via operations of the engineering function server 158 that create updated engineering data. The engineering function server 158 requests the synchronization server 156 to save the updated engineering data (210). In response, the synchronization server 156 saves the updated engineering data to the EOM 154 (212), and also transmits an update notification to any connected cloud nodes 144 to instruct the cloud nodes 144 to synchronize by updating their EOMs with the updated engineering data (214). The synchronization server 156 may also transmit update notifications to engineering system enabled automation control devices, and other local edge nodes, e.g., backup data synchronization systems.

Figure 3:
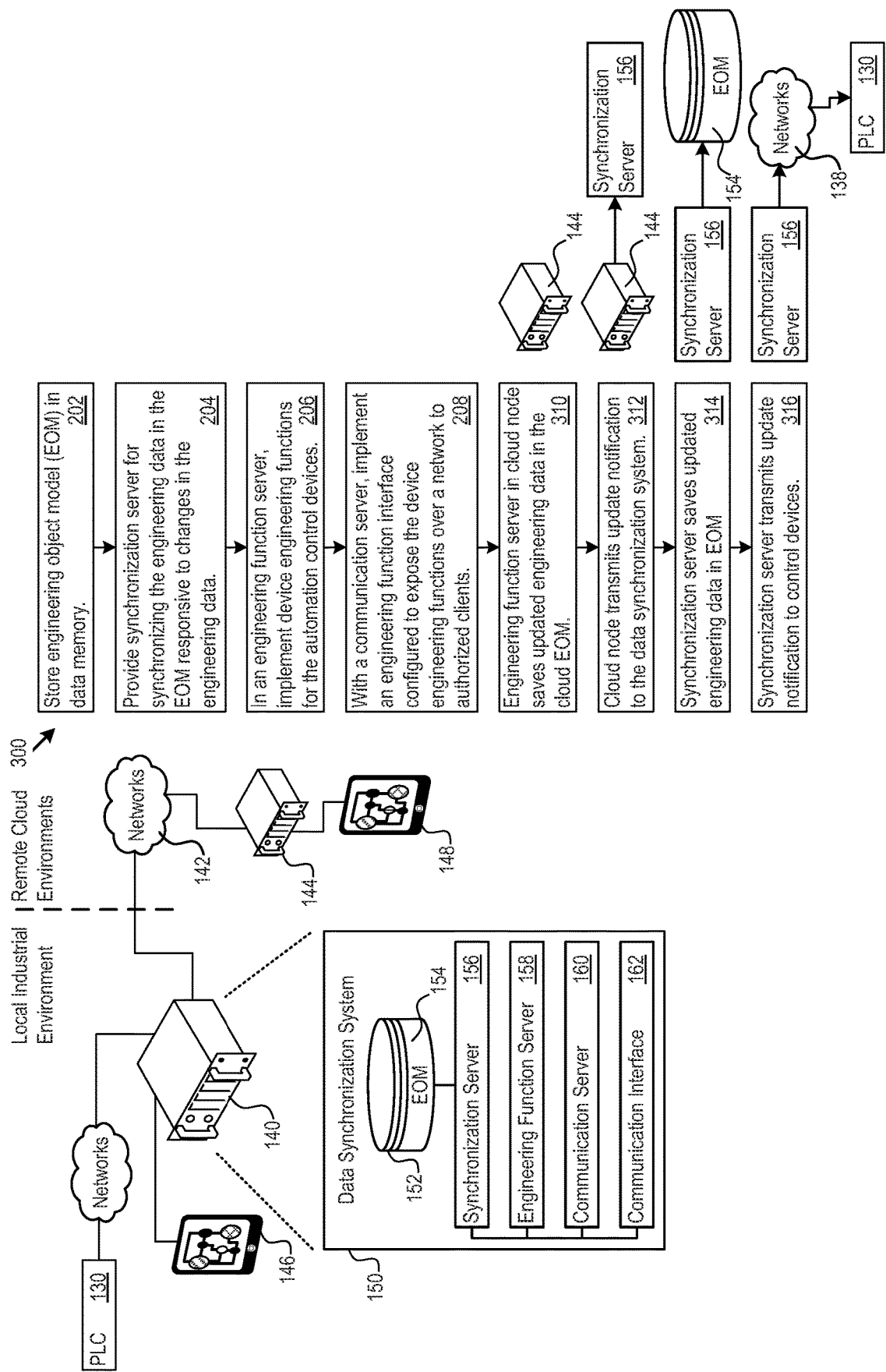
FIG. 3 shows a second example of logic for saving engineering data, with synchronization.

FIG. 3 shows a second example of logic 300 for saving engineering data, with synchronization, in the EOM 154. In this scenario, the engineering data has changed remotely, e.g., via operations of the engineering function server in the cloud node 144, creating updated engineering data. The engineering function server in the cloud node 144 saves the updated engineering data in its cloud-node EOM (310). The cloud node 144 then transmits an update notification to the data synchronization system 150 (312). In response, the synchronization server 156 saves the updated engineering data to the EOM 154 (314). Then, the synchronization server 156 transmits an update notification to connected engineering system enabled automation control devices to instruct that they update their local-node EOMs with the updated engineering data (316).

Figure 4:
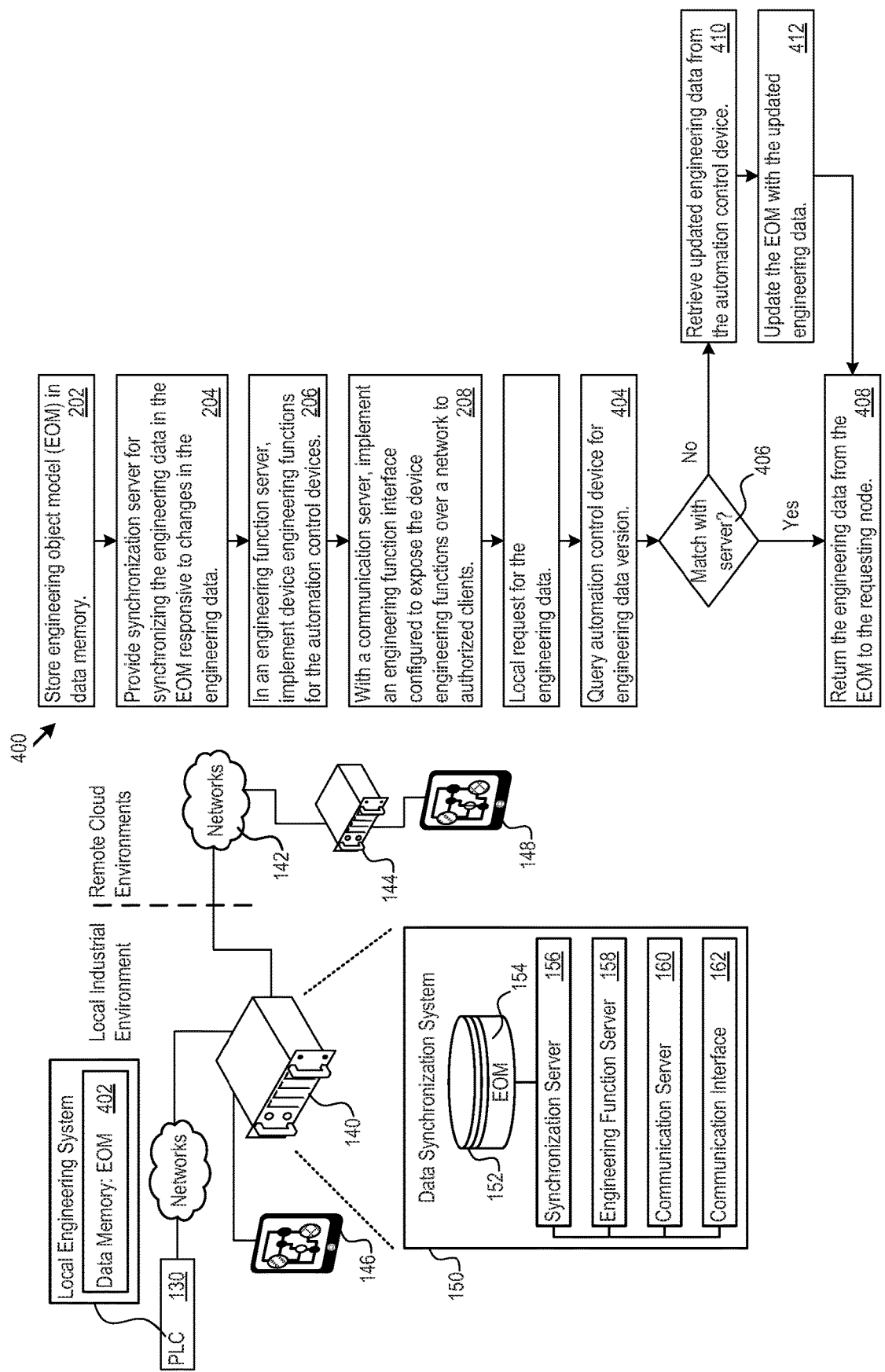
FIGS. 4 and 5 show examples of logic for loading engineering data in a synchronized manner.
Figure 5:
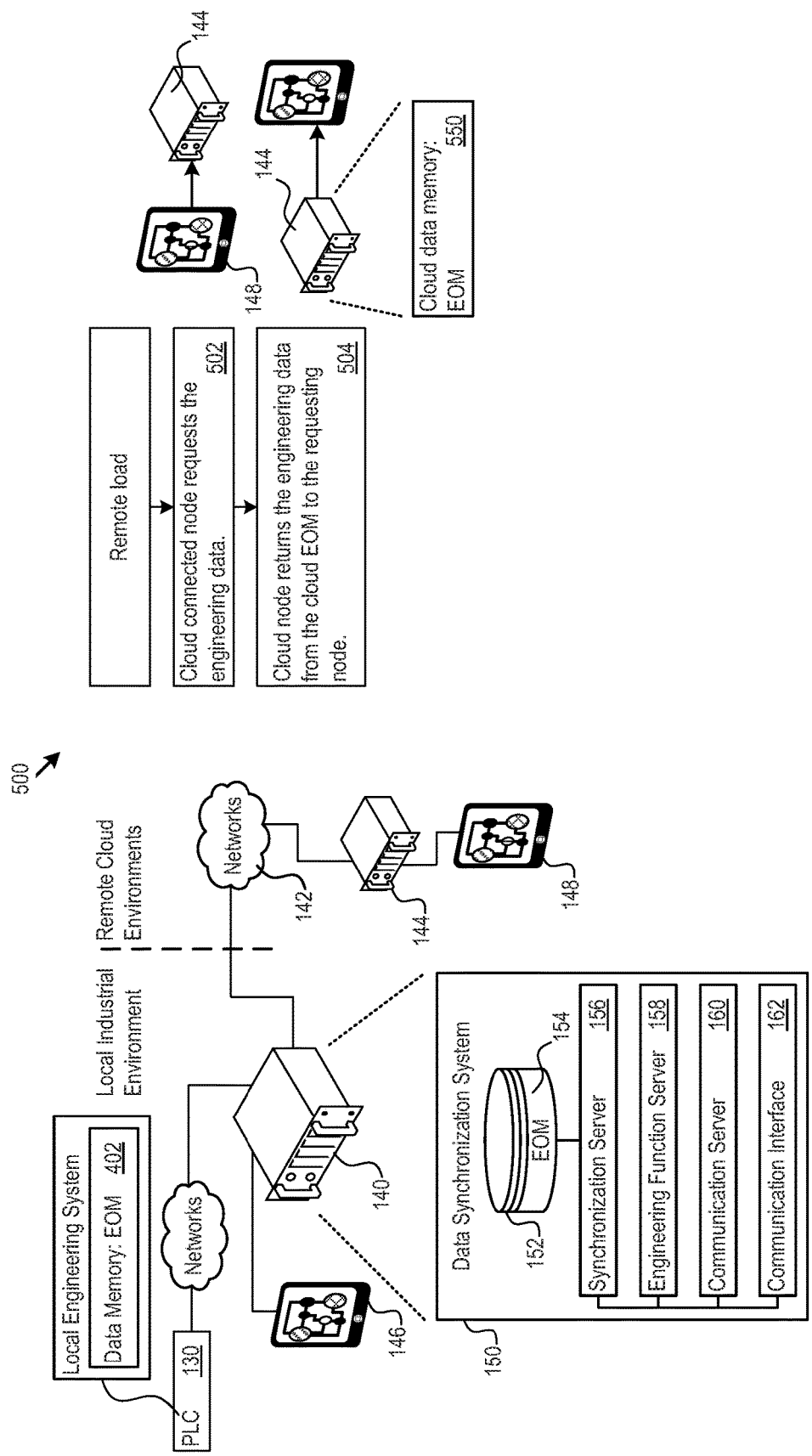

FIGS. 4 and 5 show examples of logic 400, 500 for loading engineering data in a synchronized manner. The engineering data may need to be loaded, for instance, when requested by an engineering client 146, when the engineering function server 158 needs to perform operations on the engineering data, when the cloud node 144 requests the engineering data, or for other reasons. For loading, the synchronization server 156 may query the automation control device to obtain device version information of the local-node engineering data 402 (as it is stored in the automation control device (404)). The synchronization server 156 compares the local-node version information to the edge-node synchronization server version information for the engineering data in the EOM 154 (406). When the local-node version information and the edge-node version information match, the synchronization server 156 returns the engineering data from the EOM 154 to the requesting node (408). If the version information does not match, however, the synchronization server 156 retrieves updated engineering data from the automation control device (410) and updates the engineering data in the EOM 154 with the updated engineering data (412). The synchronization server may then return the updated engineering data to the requesting node (408).

Expressed another way, the data synchronization system 150 checks whether the engineering data repository is up-to-date by matching, e.g., timestamps, of the local repository version and the automation control device data version. If matched, then the data synchronization system 150 returns the data model from the local engineering data repository, e.g., from the EOM 154. Otherwise, the data synchronization system 150 will extract the engineering data from the automation control device, update the local engineering data repository, and then send the engineering data to connected nodes to update their local engineering data models. In some implementations, a connected node, e.g., the engineering client 146, may direct the synchronization server 156 to force a load of the engineering data directly from the automation control device and return that engineering data to the connected node, thereby bypassing the version check. The engineering client 146 may perform a forced load for diagnostic purposes, for instance.

In FIG. 5, a cloud connected node (e.g., the engineering client 148 or the engineering server in the cloud node 144) requests the engineering data (502). Because the synchronization server 156 keeps the cloud EOM 550 and the local EOM 154 in synch, the cloud node 144 may retrieve and return its copy of the engineering data from the cloud EOM 550 to the requesting node (504). Note also that the engineering client 148 may direct the cloud node 144 to force a load of the engineering data directly from the automation control device, via request to the synchronization server 156. As noted above, the forced load may be useful for diagnostic or other purposes.

Figure 6:
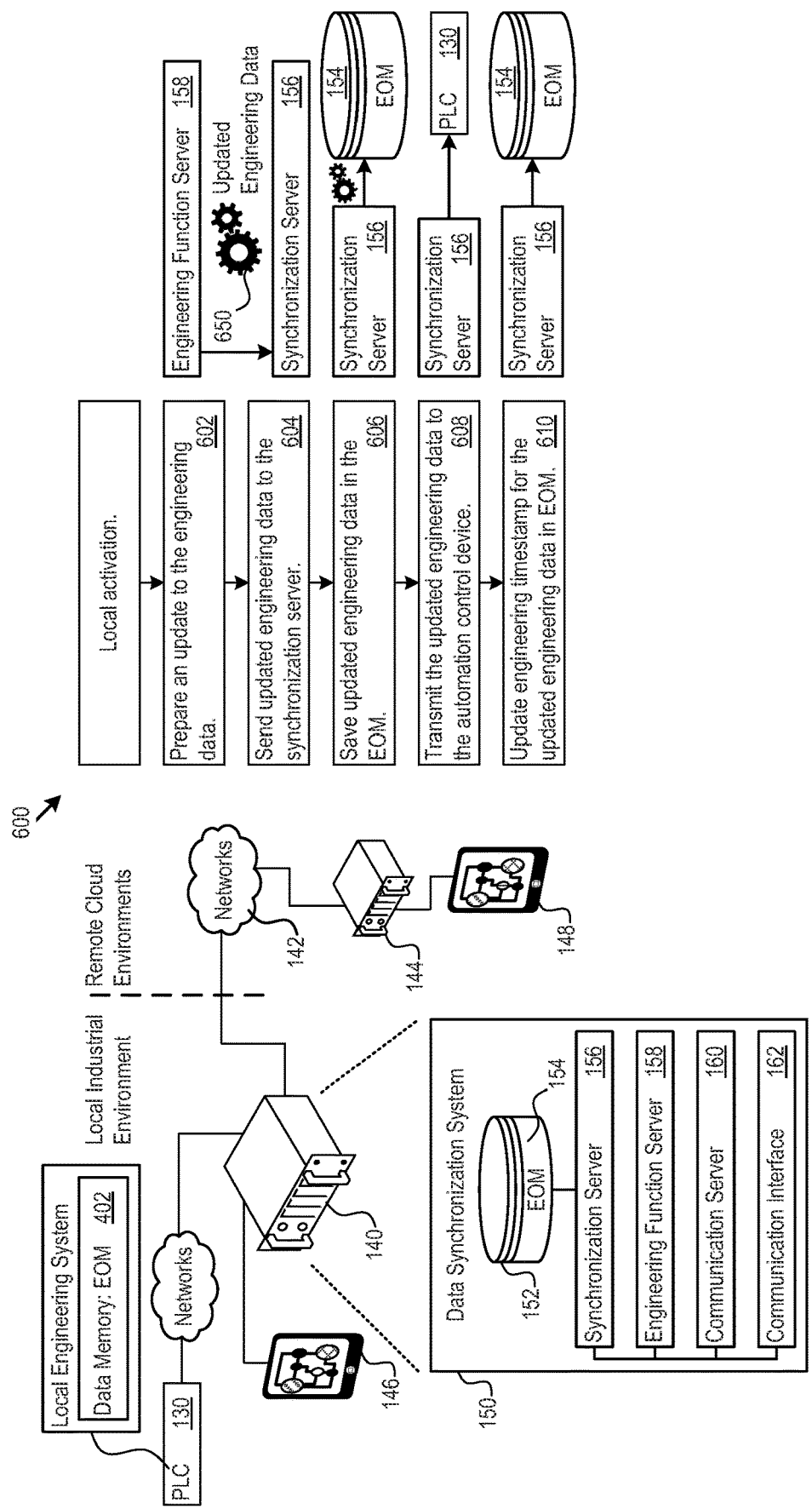
FIGS. 6 and 7 show examples of logic for activating engineering data on an automation control device.
Figure 7:
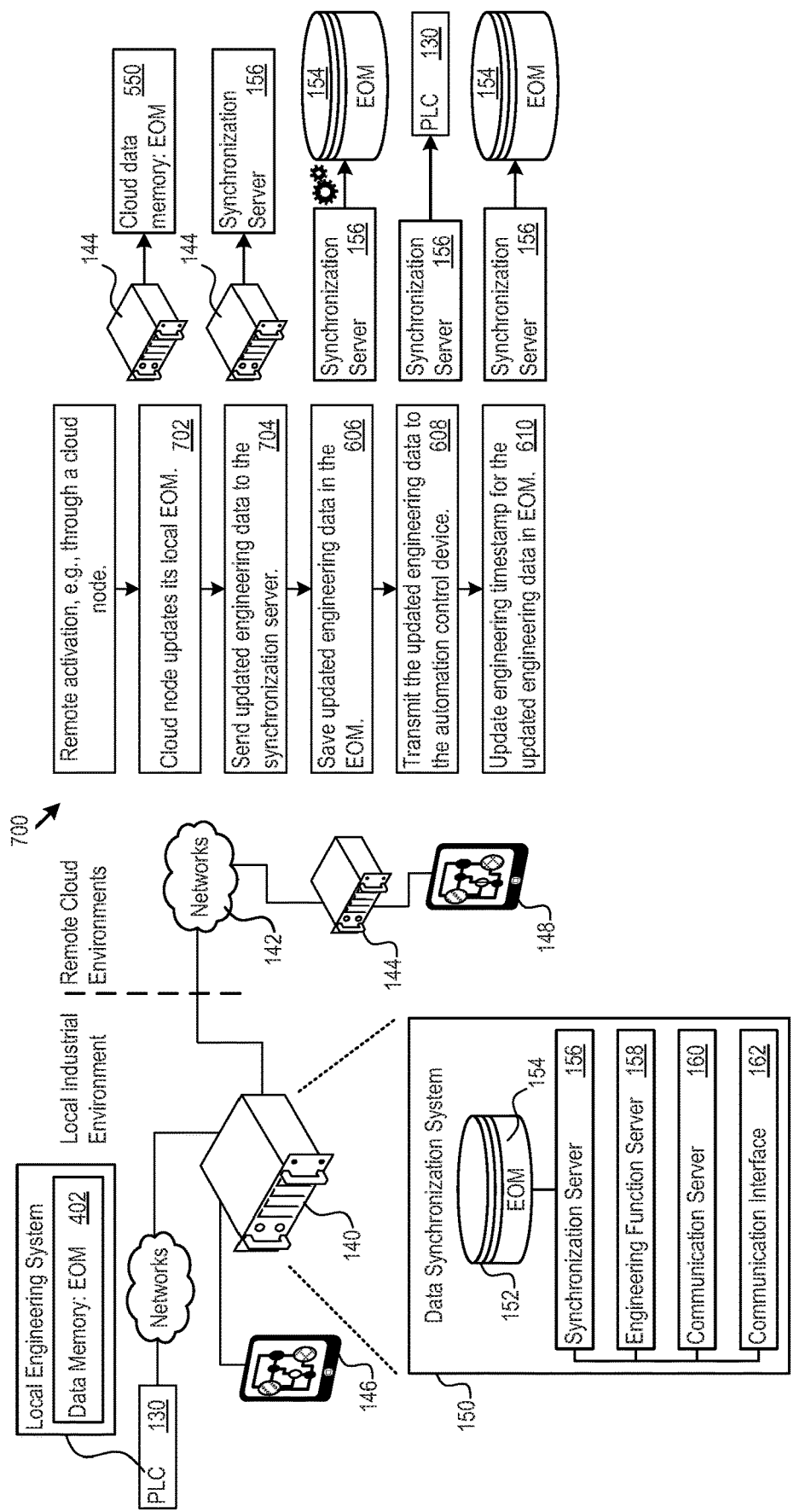

FIGS. 6 and 7 show examples of logic 600, 700 for activating engineering data on an automation control device, e.g., to compile and deploy a new control package in firmware to an automation control device. Typically, the engineering function server 158 will prepare an update to the engineering data for the automation control device (602). The engineering function server 158 sends the updated engineering data 650 to the synchronization server 156 (604), which saves the updated engineering data in the EOM 154 (606). The synchronization server 156 then transmits the updated engineering data from the EOM 154 to the automation control device (608). In addition, once the updated engineering data is saved and downloaded to the automation control device, the synchronization server 156 updates an engineering timestamp for the updated engineering data in the EOM 156 (610).

In FIG. 7, the activation operation originates remotely, e.g., with the engineering client 148 through the cloud node 144. The cloud node 144 updates its local EOM (702), and sends the updated engineering data to the synchronization server 156 in the data synchronization system 150 (704). The synchronization server 156 then follows the activation procedure explained above with respect to FIG. 6, including updating the engineering timestamp.

Figure 8:
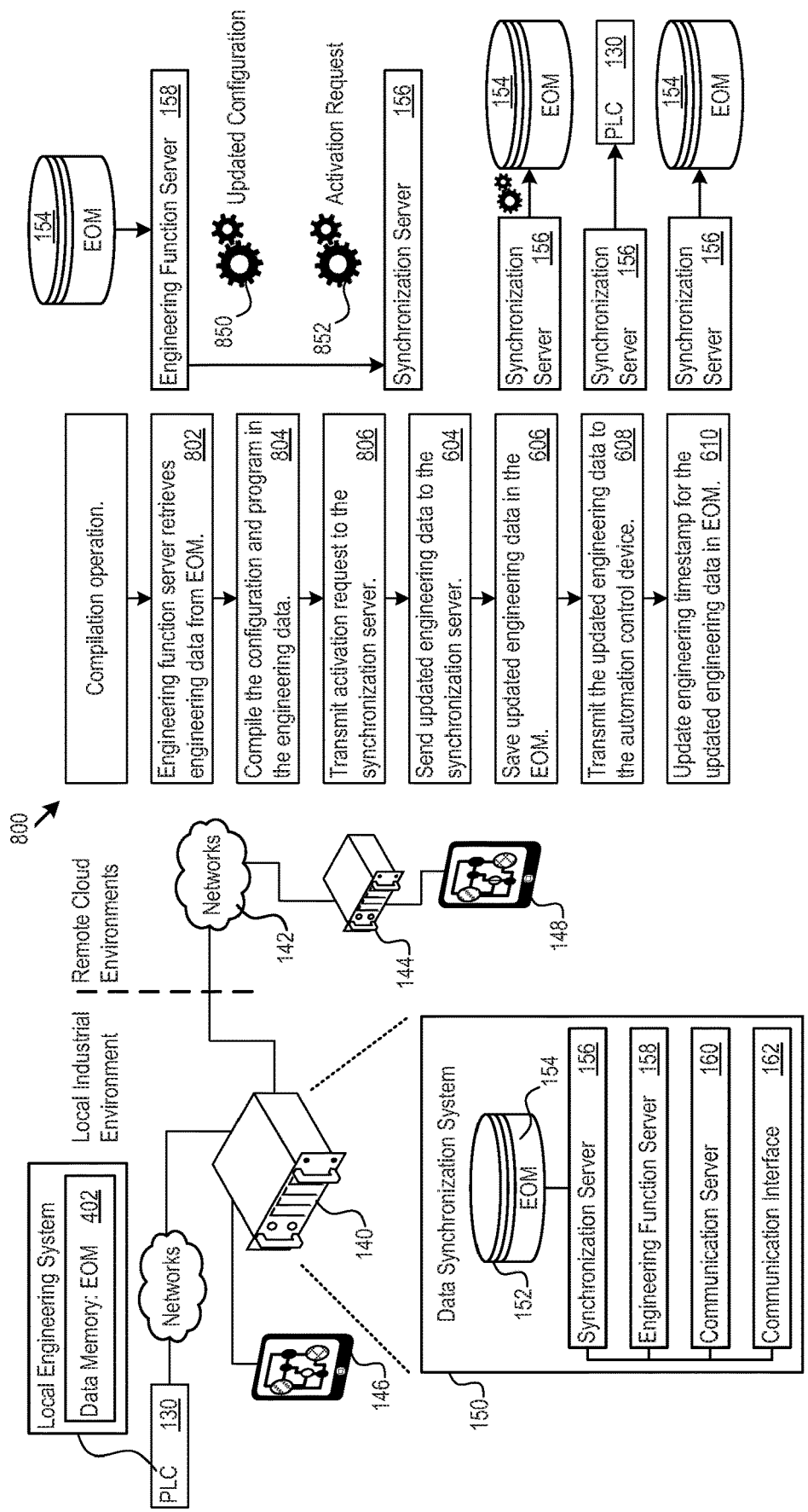
FIG. 8 shows an example of compilation logic.

FIG. 8 shows an example of compilation logic 800. Here, the engineering function server 158 retrieves the engineering data from the EOM 154 via request to the synchronization server 156 (802). The engineering function server 158 then compiles the configuration, program, and other instructions or data contained in the engineering data (804) to obtain an updated configuration 850. After compilation, the engineering function server 158 transmits an activation request 852 for the updated configuration 850 to the synchronization server 156 (806). The synchronization server carries out activation as explained above with regard to FIG. 6. Compilation in the cloud node 144 follows a similar pattern, with the cloud node engineering function server preparing the updated engineering data and requesting the cloud node synchronization server to save the updated engineering data. The cloud node synchronization server then synchronizes the updated engineering data to the EOM 154, and the synchronization server 156 activates the updated engineering data as explained above.

Figure 9:
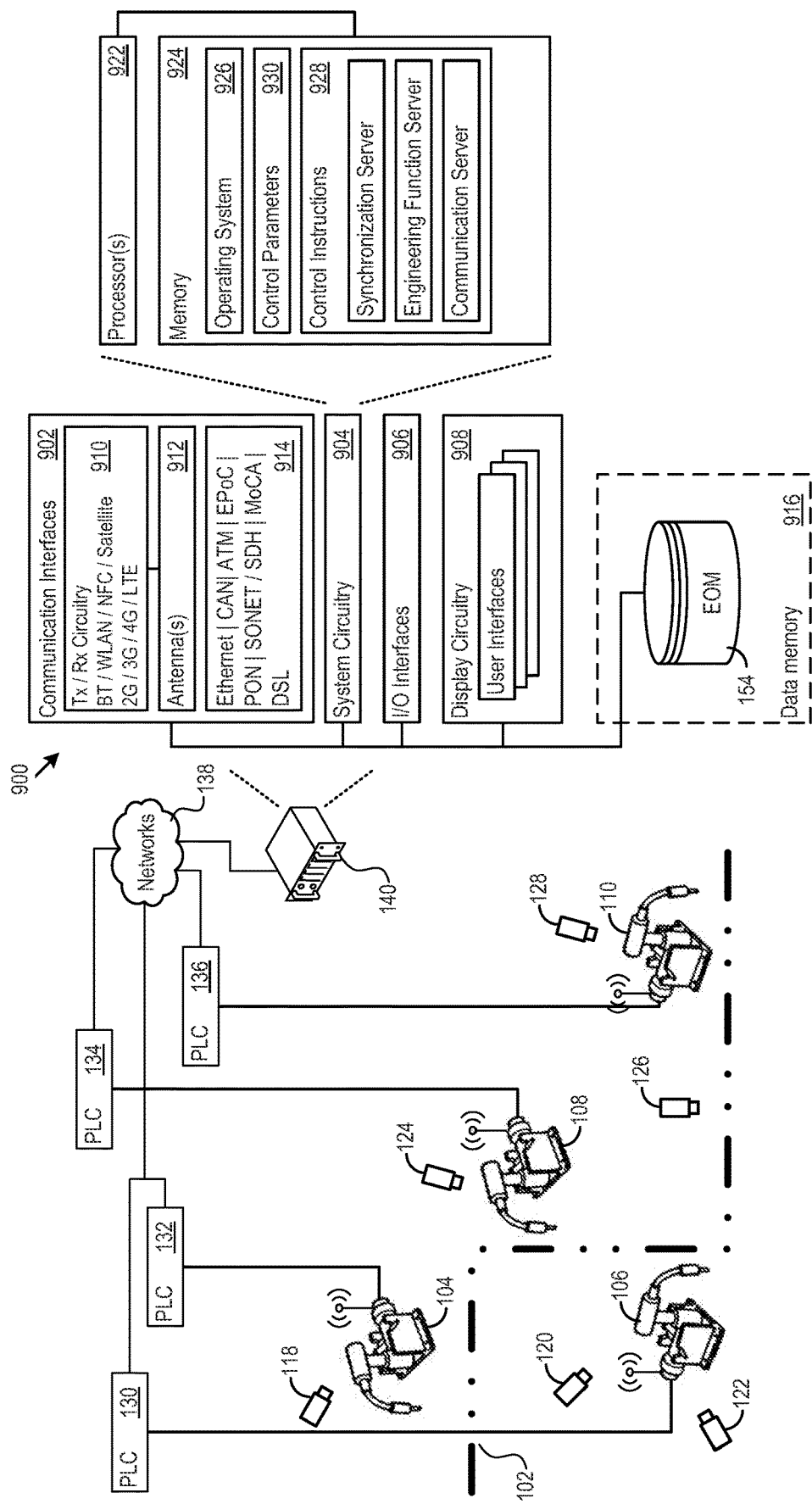
FIG. 9 shows an example implementation of a data synchronization server.

FIG. 9 shows an example implementation 900 of a data synchronization server 150 located, e.g., in the edge nodes 140 and cloud nodes 144. The implementation 900 includes communication interfaces 902, system circuitry 904, input/output (I/O) interfaces 906, and display circuitry 908. The system circuitry 904 may include any combination of hardware, software, firmware, or other circuitry. The system circuitry 904 may be implemented, for example, with one or more systems on a chip (SoC), application specific integrated circuits (ASIC), microprocessors, microcontrollers, discrete analog and digital circuits, and other circuitry. The system circuitry 904 is part of the implementation of any desired functionality in the data synchronization system 150. Accordingly, the system circuitry 904 may implement the saving, loading, compilation, and activation logic described above in FIGS. 2-8, as examples. The data synchronization system 150 may store and retrieve data from a data memory 916. For instance, the data memory 916 may store the EOM 154 for synchronizing the engineering data.

The display circuitry 908 and the I/O interfaces 906 may include a graphical user interface, touch sensitive display, voice or facial recognition inputs, buttons, switches, speakers and other user interface elements. Additional examples of the I/O interfaces 906 include Industrial Ethernet, Controller Area Network (CAN) bus interfaces, Universal Serial Bus (USB), Serial Advanced Technology Attachment (SATA), and Peripheral Component Interconnect express (PCIe) interfaces and connectors, memory card slots, and other types of inputs. The I/O interfaces 906 may further include Universal Serial Bus (USB) interfaces, audio outputs, magnetic or optical media interfaces (e.g., a CDROM or DVD drive), network (e.g., Ethernet or cable (e.g., DOCSIS) interfaces), or other types of serial, parallel, or network data interfaces.

The communication interfaces 902 may include transceivers for wired or wireless communication. The transceivers may include modulation/demodulation circuitry, digital to analog converters (DACs), shaping tables, analog to digital converters (ADCs), filters, waveform shapers, filters, preamplifiers, power amplifiers and/or other circuitry for transmitting and receiving through a physical (e.g., wireline) medium such as coaxial cable, Ethernet cable, or a telephone line, or through one or more antennas. Accordingly, Radio Frequency (RF) transmit (Tx) and receive (Rx) circuitry 910 handles transmission and reception of signals through one or more antennas 912, e.g., to support Bluetooth (BT), Wireless LAN (WLAN), Near Field Communications (NFC), and 2G, 3G, and 4G/Long Term Evolution (LTE) communications.

Similarly, the non-wireless transceivers 914 may include electrical and optical networking transceivers. Examples of electrical networking transceivers include Profinet, Ethercat, OPC-UA, TSN, HART, and WirelessHART transceivers, although the transceivers may take other forms, such as coaxial cable network transceivers, e.g., a DOCSIS compliant transceiver, Ethernet, and Asynchronous Transfer Mode (ATM) transceivers. Examples of optical networking transceivers include Synchronous Optical Networking (SONET) and Synchronous Digital Hierarchy (SDH) transceivers, Passive Optical Network (PON) and Ethernet Passive Optical Network (EPON) transceivers, and EPON Protocol over Coax (EPoC) transceivers.

Note that the system circuitry 904 may include one or more controllers 922, e.g., microprocessors, microcontrollers, FPGAs, GPUs, Intel Movidius™ or ARM Trillium™ controllers, and memories 924. The memory 924 stores, for example, an operating system 926 and control instructions 928 that the controller 922 executes to carry out desired functionality for the data synchronization system 150. Accordingly, the control instructions 928 may implement the logic described above for the synchronization server 156, engineering function server 158, and communication server 160, particularly with regard to FIGS. 2-8. The control parameters 930 provide and specify configuration and operating options for the control instructions 928.

The data synchronization system 150 solves the technical challenges of distributed automation engineering across local automation control devices, edge nodes and cloud nodes, by employing, e.g., web technologies on a common software base. The data synchronization system 150 provides efficient, up-to-date access to engineering data, with seamless management across the different nodes. In addition, the data synchronization system 150 provides consistent data functions across the nodes and automatically decides and executes engineering data saving, loading, and activation. Note also that the synchronization server 156 reliably and independently manages the EOM 154 to decouple the engineering function server data dependencies from the EOM 154.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Various implementations have been specifically described. However, many other implementations are also possible.

What is claimed is:

1. An engineering data synchronization system for an industrial automation environment, the engineering data synchronization system comprising:
   a data memory storing an engineering object model (EOM) comprising engineering data for an automation control device in the industrial automation environment;
   a synchronization server in communication with the data memory, the synchronization server configured to synchronize the engineering data in the EOM responsive to changes in the engineering data;
   an engineering function server in communication with the synchronization server, the engineering function server configured to implement the device engineering functions for the automation control device on the engineering data; and
   a communication server in communication with the engineering function server, the communication server implementing an engineering function interface configured to expose the device engineering functions for the automation control device over a network to authorized clients that request execution of the device engineering functions.

2. The system of claim 1, further comprising:
   a communication interface configured for communication between the synchronization server, a separate cloud node, and the automation control device.

3. The system of claim 2, where:
   the synchronization server is configured to synchronize the engineering data in the EOM by transmitting an update notification of updated engineering data through the communication interface to the separate cloud node.

4. The system of claim 2, where:
   the synchronization server is configured to synchronize the engineering data in the EOM by receiving an update notification of updated engineering data through the communication interface from the separate cloud node, and responsively updating the EOM with the updated engineering data.

5. The system of claim 2, where:
   the synchronization server is further configured to transmit the updated engineering data through the communication interface to the automation control device.

6. The system of claim 2, where:
   the synchronization server is configured to perform an engineering data load operation for the engineering data from a requesting node by:
   querying the automation control device for device version information of locally stored engineering data as it is stored in the automation control device;
   comparing the device version information to synchronization server version information for the engineering data in the EOM; and when the device version information and the server version information match, returning the engineering data from the EOM to the requesting node.

7. The system of claim 2, where:
the synchronization server is configured to perform an engineering data load operation for the engineering data from a requesting node by:
querying the automation control device for device version information for the engineering data as stored locally in the automation control device;
comparing the device version information to synchronization server version information for the engineering data; and
when the device version information and the server version information do not match:
retrieving updated engineering data from the automation control device;
updating the engineering data in the EOM with the updated engineering data; and
returning the updated engineering data to the requesting node.

8. The system of claim 2, where:
the synchronization server is configured to perform an engineering activation operation for the automation control device by:
updating the engineering data in the EOM;
transmitting the engineering data from the EOM to the automation control device; and
updating an engineering timestamp for the engineering data in the EOM.

9. The system of claim 2, where:
the engineering function server is configured to perform a compilation operation by:
retrieving the engineering data from the EOM;
compiling the engineering data to obtain an updated automation control device configuration; and
transmitting an activation request for the updated automation control device configuration to the synchronization server.

10. In an industrial automation environment, a method for engineering data synchronization comprising:
storing, in a data memory, an engineering object model (EOM) comprising engineering data for an automation control device in the industrial automation environment;
with a synchronization server in communication with the data memory, synchronizing the engineering data in the EOM responsive to changes in the engineering data;
with an engineering function server in communication with the synchronization server, implementing the device engineering functions for the automation control device on the engineering data; and
with a communication server in communication with the engineering function server, implementing an engineering function interface configured to expose the device engineering functions for the automation control device over a network to authorized clients that request execution of the device engineering functions.

11. The method of claim 10, further comprising:
providing a communication interface between the synchronization server, a separate cloud node, and the automation control device in the industrial automation environment.

12. The method of claim 11, further comprising:
with the synchronization server, synchronizing the engineering data in the EOM by transmitting an update notification of updated engineering data through the communication interface to the separate cloud node.

13. The method of claim 11, further comprising:
with the synchronization server, synchronizing the engineering data in the EOM by receiving an update notification of updated engineering data through the communication interface from the separate cloud node, and responsively updating the EOM.

14. The method of claim 11, further comprising:
with the synchronization server, transmitting the updated engineering data through the communication interface to the automation control device.

15. The method of claim 11, further comprising:
with the synchronization server, performing an engineering data load operation for the engineering data from a requesting node by:
querying the automation control device for device version information of locally stored engineering data as it is stored in the automation control device;
comparing the device version information to synchronization server version information for the engineering data; and
when the device version information and the server version information match, returning the engineering data from the EOM to the requesting node.

16. The method of claim 11, further comprising:
with the synchronization server, performing an engineering data load operation for the engineering data from a requesting node by:
querying the automation control device for device version information for the engineering data as stored locally in the automation control device;
comparing the device version information to synchronization server version information for the engineering data; and
when the device version information and the server version information do not match:
retrieving updated engineering data from the automation control device;
updating the engineering data in the EOM with the updated engineering data; and
returning the updated engineering data to the requesting node.

17. The method of claim 11, further comprising:
with the synchronization server, performing an engineering activation operation for the automation control device by:
updating the engineering data in the EOM;
transmitting the engineering data from the EOM to the automation control device; and
updating an engineering timestamp for the engineering data in the EOM.

18. The method of claim 11, further comprising:
with the engineering function server, performing a compilation operation by:
retrieving the engineering data from the EOM;
compiling the engineering data to obtain an updated automation control device configuration; and
transmitting an activation request for the updated automation control device configuration to the synchronization server.

19. An engineering data synchronization system for an industrial automation environment, the engineering data synchronization system comprising:
a data repository comprising:
an engineering object model (EOM) for an automation control device in an automation environment; and system circuity defining:
synchronization logic configured to synchronize the engineering data in the EOM responsive to changes in the engineering data;
engineering function logic configured to implement the device engineering functions for the automation control device on the engineering data; and
communication logic implementing an engineering function interface configured to expose the device engineering functions for the automation control device over a network to authorized clients that request execution of the device engineering functions, wherein the synchronization logic is configured to perform:
 an engineering data load operation for the engineering data; and
 an engineering activation operation on the engineering data for the automation control device; and where:
the engineering function logic is configured to perform:
 a compilation operation on the engineering data for the automation control device.

* * * * *